United States Patent
Curcic et al.

(10) Patent No.: US 10,273,145 B2
(45) Date of Patent: Apr. 30, 2019

(54) METHOD FOR PROTECTING A MEMS UNIT AGAINST INFRARED INVESTIGATIONS AND MEMS UNIT

(71) Applicant: Robert Bosch GmbH, Stuttgart (DE)

(72) Inventors: Michael Curcic, Stuttgart (DE); Oliver Willers, Korb (DE); Sven Zinober, Friolzheim (DE); Ulrich Kunz, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/935,944

(22) Filed: Mar. 26, 2018

(65) Prior Publication Data
US 2018/0297835 A1    Oct. 18, 2018

(30) Foreign Application Priority Data
Apr. 13, 2017   (DE) .................. 10 2017 206 385

(51) Int. Cl.
*B81B 7/00*   (2006.01)
*B81C 1/00*   (2006.01)

(52) U.S. Cl.
CPC ........ *B81B 7/0012* (2013.01); *B81C 1/00539* (2013.01); *B81B 2201/0228* (2013.01)

(58) Field of Classification Search
CPC ................................................. B81B 7/0012
See application file for complete search history.

(56) References Cited

U.S. PATENT DOCUMENTS

| | | | |
|---|---|---|---|
| 2004/0130775 A1* | 7/2004 | Grebinski | B81B 7/0012 359/291 |
| 2005/0067633 A1* | 3/2005 | Mushika | B81B 7/0006 257/202 |
| 2006/0077504 A1* | 4/2006 | Floyd | B81B 7/0012 359/237 |
| 2012/0219760 A1* | 8/2012 | Detry | B81B 3/0081 428/158 |
| 2015/0200775 A1 | 7/2015 | Guajardo Merchan et al. | |

* cited by examiner

*Primary Examiner* — Walter H Swanson
(74) *Attorney, Agent, or Firm* — Norton Rose Fulbright US LLP; Gerard Messina

(57) ABSTRACT

A method is provided for protecting a MEMS unit, in particular a MEMS sensor, against infrared investigations, a surface patterning being performed for at least one first area of a surface of the MEMS unit, the first area absorbing, reflecting or diffusely scattering more than 50%, in particular more than 90% of an infrared light incident upon it.

20 Claims, 1 Drawing Sheet

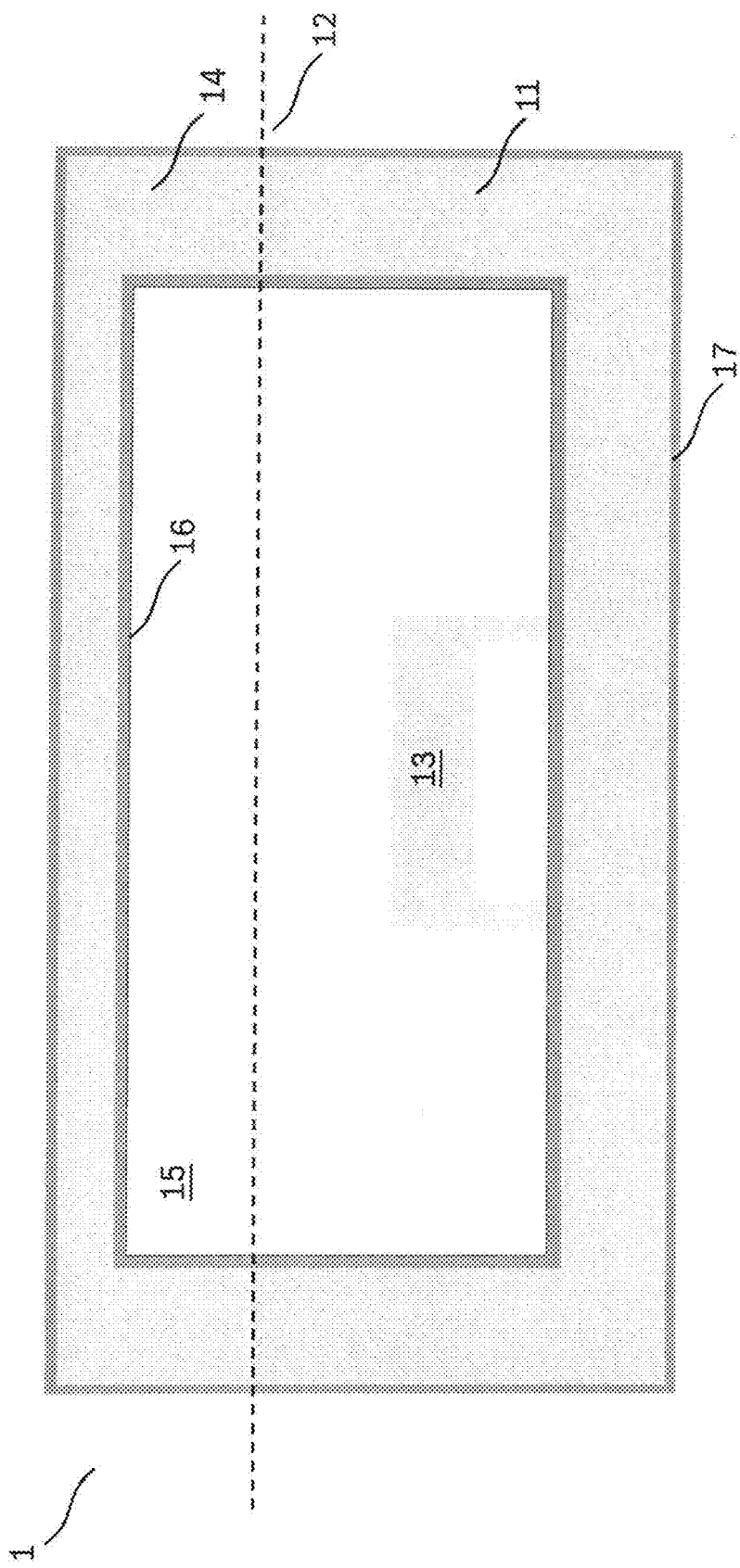

METHOD FOR PROTECTING A MEMS UNIT AGAINST INFRARED INVESTIGATIONS AND MEMS UNIT

CROSS REFERENCE

The present application claims the benefit under 35 U.S.C. § 119 of German Patent Application No. DE DE 102017206385.8 filed on Apr. 13, 2017, which is expressly incorporated herein by reference in its entirety.

FIELD OF THE INVENTION

The present invention relates to methods for protecting a MEMS unit, in particular a MEMS sensor, against infrared investigations as well as to a MEMS unit and MEMS sensor for this purpose.

BACKGROUND INFORMATION

Microsystems (microelectromechanical systems, MEMS) have made strong gains in importance in recent years. MEMS sensors such as, e.g., MEMS-based inertial sensors are used in countless electronic devices and systems.

The use of secret keys that cannot be read out or copied are the basis for data security in the networked world. These keys are used, e.g., for encrypting data transmissions or also for authenticating network subscribers. After initially pure software keys were used and are still used in non-volatile memories, possibly in especially protected memory areas, the trend is clearly in the direction of hardware-based keys. The currently most prevalent method is the so-called SRAM-PUF (physical unclonable function) in which manufacturing tolerances in transistors result in a random, but repeatable switched state of memory cells after the operating voltage has been applied. SRAM-PUFs, however, have already been read out as well as copied, albeit with considerable effort.

U.S. Patent Application Publication No. 2015/200775A describes the use of MEMS sensors for hardware-based keys. For this purpose, the most varied and unique manufacturing-based electromechanical properties of these sensors such as, e.g., resonant frequencies (modes), capacitances, internal auxiliary signals are captured by an evaluation circuit and combined to form a key. Invasive methods, i.e. opening the sensors, normally result in the destruction of the key since e.g. die pressure conditions in the interior of the sensor and the mechanical stresses in the sensor change.

Using currently emerging modern infrared measuring methods such as IR vibrometry or IR interferometry, there is the risk that parts of the key may be read out in a non-invasive manner through the silicon that is transparent for IR light, which reduces the security of the key markedly.

SUMMARY

Methods are provided, by which a MEMS unit, in particular a MEMS sensor, is protected against infrared spectroscopic investigations in that these are prevented or at least rendered more difficult. For this purpose, at least one area of a surface of the MEMS unit or of the MEMS sensor is patterned in such a way that, due to its optical properties, this patterned area absorbs, reflects or diffusely scatters at least 50%, in particular at least 90% of an incident infrared light or an infrared light that is irradiated upon it. Non-invasive investigations of internal physical properties by infrared investigation are thereby prevented or rendered more difficult and in particular the security of secrets or keys derived from the properties is ensured or improved.

The main points of approach in this respect are to make the system nontransparent for IR light or to minimize the transmission and/or optical sharpness to such an extent that reading out or analyzing the structure information required for an ascertainment is no longer possible or is no longer readily possible.

The protection is particularly high if the patterned area has such structural properties (e.g., depth and surface of the patterning) and optical properties (e.g., changed material properties due to the patterning) that infrared light striking from any incident angle onto the structured area is absorbed, reflected or diffusely scattered by the structured area at 50%, in particular at least at 90%.

In order to continue to protect the unit or sensor particularly well, in a preferred embodiment, the patterned area is situated in the unit or in the sensor in such a way that light from any direction passes through the at least one area between a surface of the MEMS unit or MEMS sensor and the cavity.

Particularly suitable for the patterning are etching methods, e.g. especially a KOH etching method, in order to achieve the desired optical properties, in particular, if the MEMS unit or the MEMS sensor are made up (largely) of silicon. Alternatively, it is also possible to use other known methods for surface patterning.

The surface patterning may result in an increased roughness of the surface and thus reduce the transmission of infrared light. It is also possible for grid structures to be applied on the surface or introduced into the surface, which likewise reduce the transmission of infrared light by reflecting and scattering properties. The surface structure may also act in particular as a retroreflector or a triple mirror and thus reduce the transmission of infrared light due to very high reflection components.

MEMS units protected in this way are in particular sensors having a base structure, a sensor cap, an evacuated cavity bounded by the base structure and the sensor cap, and a functional sensor structure applied on the base structure.

In particularly preferred developments, the surface area is patterned prior to completing the MEMS unit or the MEMS sensor, in particular prior to bonding parts of the MEMS unit or the MEMS sensor, the patterned area not being accessible from outside since, e.g., the inner surface of the MEMS unit or the MEMS sensor, which bounds a cavity of the MEMS unit or MEMS sensor, is patterned. As a result, it is impossible to remove the structured area without invasive intervention into the unit or the sensor and without great effort.

In alternative preferred developments, the surface area is doped following the production of the MEMS unit or of the MEMS sensor and thus comprises parts of an outer surface of the MEMS unit or MEMS sensor. To be sure, a protection against removal of the patterned area is in this case often reduced. Nevertheless, here too a removal is laborious and possibly results in damage to the unit or to the sensor. Moreover, in these developments, the surface patterning is easier to accomplish.

BRIEF DESCRIPTION OF THE DRAWING

The present invention is explained below in greater detail with reference to the FIGURE and on the basis of exemplary embodiments.

FIG. 1 schematically shows an exemplary MEMS sensor.

DETAILED DESCRIPTION OF EXAMPLE EMBODIMENTS

In measurements using laser IR vibrometry on MEMS sensors, transmission values for infrared frequencies were ascertained in the range of typically approx. 50%. With such measurements, it is possible to determine frequencies in the sensor structure and thus to make inferences regarding the physical properties of the MEMS sensor on which a PUF is based and thus inferences regarding the PUF. The present invention relates to securing MEMS sensors against an investigation using infrared spectroscopy. Aside from MEMS sensors it is also possible to use MEMS units, whose proper functional MEMS structure is optimized in such a way for PUF functionality that the MEMS unit is no longer able to perform any (significant) sensor functions, but serves primarily as a PUF base. Such MEMS units are also to be protected against infrared investigations.

FIG. 1 shows a MEMS sensor 1. MEMS sensor 1 has a base wafer 11, whose delimitation vis-a-vis the other layers 14 is shown by separating line 12. MEMS sensor 1 has additional layers 14, which together with base wafer 11 enclose a cavity 15. Layers 14 may be connected to layers 11 by a bonding method. Layers 14 are also referred to as a so-called sensor cap. A vacuum is preferably produced in cavity 15. The actual functional sensor structure 13 of MEMS sensor 1 is situated in cavity 15 and on base wafer 11.

Layers 11 and layers 14 as well as sensor structure 13 are usually made of silicon. The MEMS sensor in FIG. 1 now has surface areas 16, 17, which were processed by surface patterning. In FIG. 1, the patterned area 16 extends along an inner surface of layers 11 and 14, that is, the surface facing cavity 15. The patterned area 17 extends along an outer surface of layers 11 and 14. Because of their surface structures, surface areas 16 and 17 prevent or render more difficult an investigation of the MEMS sensor using infrared-spectroscopic methods since they are (largely) non-transparent for infrared frequencies and therefore sufficient transmission values for a spectroscopic investigation are not achieved. The depth, the surface and the type of patterning of the structured areas 16 and 17 are selected in such a way that at least 50% of an IR light irradiated upon the areas is absorbed, reflected or diffusely scattered, in particular at least 90%.

Due to the location in the interior of the MEMS sensor 1, a removal of the patterned area 16 by an attacker of the PUF is hardly possible since this would massively damage sensor 1 as well as destroy the vacuum of cavity 15. Such an intervention into the sensor structure may also have the consequence that impressed mechanical states of stress (e.g., from the molding process) or pressure ratios change and that as a result the physical properties or the precise expression of the sensor properties, on which the PUF is based, change slightly. The security against manipulation is thus greatly increased. As described, structured are 17 is located on the outer surface of MEMS sensor 1. Here, a protection against a removal of the surface structures is no longer quite as high as for the area 16. However, grinding down the area 17 continues to be laborious and may damage MEMS sensor 1 so that an attack on the PUF of the MEMS sensor is at least rendered much more difficult.

What is claimed is:

1. A method for protecting a MEMS unit against infrared investigations, the method comprising:
performing a surface patterning of at least one area of a surface of the MEMS unit, so that the at least one area absorbs, reflects, or diffusely scatters more than 50% of an infrared light incident upon the at least one area.

2. The method as recited in claim 1, wherein the MEMS unit is a MEMS sensor.

3. The method as recited in claim 1, wherein the at least one area absorbs, reflects, or diffusely scatters more than 90% of the infrared light incident upon the at least one area.

4. The method as recited in claim 1, wherein the surface patterning is performed prior to a bonding of parts of the MEMS unit.

5. The method as recited in claim 4, wherein the at least one area is an inner surface of the MEMS unit and borders on a cavity of the MEMS unit.

6. The method as recited in claim 1, wherein the at least one area includes an outer surface of the MEMS unit, and the surface patterning is performed on the outer surface of the MEMS unit after bonding of parts of the MEMS unit with a cavity therein.

7. The method as recited in claim 1, wherein the infrared light striking the at least one area from any angle of incidence is absorbed, reflected, or diffusely scattered by the at least one area at at least 90%.

8. The method as recited in claim 1, wherein the surface patterning occurs by KOH etching.

9. The method as recited in claim 1, wherein the surface patterning increases a roughness of the at least one area.

10. The method as recited in claim 1, wherein the surface patterning of the at least one area includes grid structures.

11. The method as recited in claim 1, wherein the at least one area acts as a retroreflector or triple mirror, as a result of the surface patterning.

12. The method as recited in claim 1, wherein the MEMS unit includes a base structure, a sensor structure, a cavity, and a sensor cap, and the at least one area that is surface patterned includes an area of the surface facing away from the cavity.

13. The method as recited in claim 12, wherein the at least one area is situated in such a way that light passing, in any direction, from outside the MEMS unit into the cavity passes through the area of the surface facing away from the cavity.

14. The method as recited in claim 1, wherein the MEMS unit includes a base structure, a sensor structure, a cavity, and a sensor cap, and the at least one area that is surface patterned includes an area of the surface facing the cavity.

15. The method as recited in claim 14, wherein the at least one area is situated in such a way that light passing, in any direction, from outside the MEMS unit into the cavity passes through the area of the surface facing the cavity.

16. A MEMS unit having a surface that includes at least one area that has a surface patterning, the at least one area absorbing, reflecting, or diffusely scattering more than 50% of an irradiated infrared light.

17. The MEMS unit as recited in claim 16, wherein the MEMS unit includes a base structure, a sensor structure, a cavity, and a sensor cap, and the at least one area includes an area of the surface facing the cavity.

18. The MEMS unit as recited in claim 17, wherein the at least one area is situated in such a way that light passing, in any direction, from outside the MEMS unit into the cavity passes through the area of the surface facing the cavity.

19. The MEMS unit as recited in claim 16, wherein the MEMS unit includes a base structure, a sensor structure, a cavity, and a sensor cap, and the at least one area includes an area of the surface facing away from the cavity.

20. The MEMS unit as recited in claim 19, wherein the at least one area is situated in such a way that light passing, in any direction, from outside the MEMS unit into the cavity passes through the area of the surface facing away from the cavity.

\* \* \* \* \*